(12) United States Patent
Yamamoto

(10) Patent No.: US 12,481,140 B2
(45) Date of Patent: Nov. 25, 2025

(54) SAMPLE OBSERVATION DEVICE AND SAMPLE OBSERVATION METHOD WITH PLANAR LIGHT HAVING DIFFERENT WAVELENGTHS

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 16 days.

(21) Appl. No.: 18/285,528

(22) PCT Filed: Mar. 17, 2022

(86) PCT No.: PCT/JP2022/012219
§ 371 (c)(1),
(2) Date: Oct. 4, 2023

(87) PCT Pub. No.: WO2023/007828
PCT Pub. Date: Feb. 2, 2023

(65) Prior Publication Data
US 2024/0184090 A1    Jun. 6, 2024

(30) Foreign Application Priority Data

Jul. 26, 2021 (JP) .................................. 2021-121609

(51) Int. Cl.
*G02B 21/00* (2006.01)
*G02B 21/36* (2006.01)
(Continued)

(52) U.S. Cl.
CPC ..... *G02B 21/0032* (2013.01); *G02B 21/0036* (2013.01); *G02B 21/008* (2013.01);
(Continued)

(58) Field of Classification Search
CPC ............ G02B 21/0032; G02B 21/0036; G02B 21/008; G02B 21/361; G02B 21/365; H04N 23/10; H04N 23/56
See application file for complete search history.

(56) References Cited

U.S. PATENT DOCUMENTS

2020/0041776 A1* 2/2020 Yamamoto ............. G02B 21/36
2021/0199585 A1* 7/2021 Tatsuta ............... G02B 21/0076

FOREIGN PATENT DOCUMENTS

EP         3654019     *   5/2020
EP         3654019 A1    5/2020
(Continued)

OTHER PUBLICATIONS

Extended European Search Report issued on Mar. 5, 2025 in corresponding European patent application 22848912.6 (9 pages).
(Continued)

*Primary Examiner* — James T Boylan
(74) *Attorney, Agent, or Firm* — Faegre Drinker Biddle & Reath LLP

(57) ABSTRACT

A sample observation device includes an irradiation optical system that emits planar light and having different wavelengths so as to pass through cross sections at different positions of the sample, a scanning unit that scans the sample with respect to the irradiation surfaces and, an imaging optical system that has an observation axis inclined with respect to the irradiation surfaces and images each of light images of observation light, an image acquiring unit that acquires each of first image data and second image data during scanning of the sample by the scanning unit, and an image generating unit that generates observation image data and the sample on the basis of the first image data and the second image data.

14 Claims, 13 Drawing Sheets

(51) Int. Cl.
     *H04N 23/10*      (2023.01)
     *H04N 23/56*      (2023.01)

(52) U.S. Cl.
     CPC ......... *G02B 21/361* (2013.01); *G02B 21/365* (2013.01); *H04N 23/10* (2023.01); *H04N 23/56* (2023.01)

(56) References Cited

FOREIGN PATENT DOCUMENTS

| | | | | |
|---|---|---|---|---|
| JP | S62-180241 A | 8/1987 | | |
| JP | 2013-156286 A | 8/2013 | | |
| JP | 2018-063292 A | 4/2018 | | |
| WO | WO-2019/198308 A1 | 10/2019 | | |
| WO | WO 2019198308 | * 10/2019 | ............ | G01N 21/49 |
| WO | WO-2019/230878 A1 | 12/2019 | | |

OTHER PUBLICATIONS

English-language translation of International Preliminary Report on Patentability (IPRP) dated Feb. 8, 2024 that issued in WO Patent Application No. JP2022/012219.

* cited by examiner

*Fig.4*
(A)
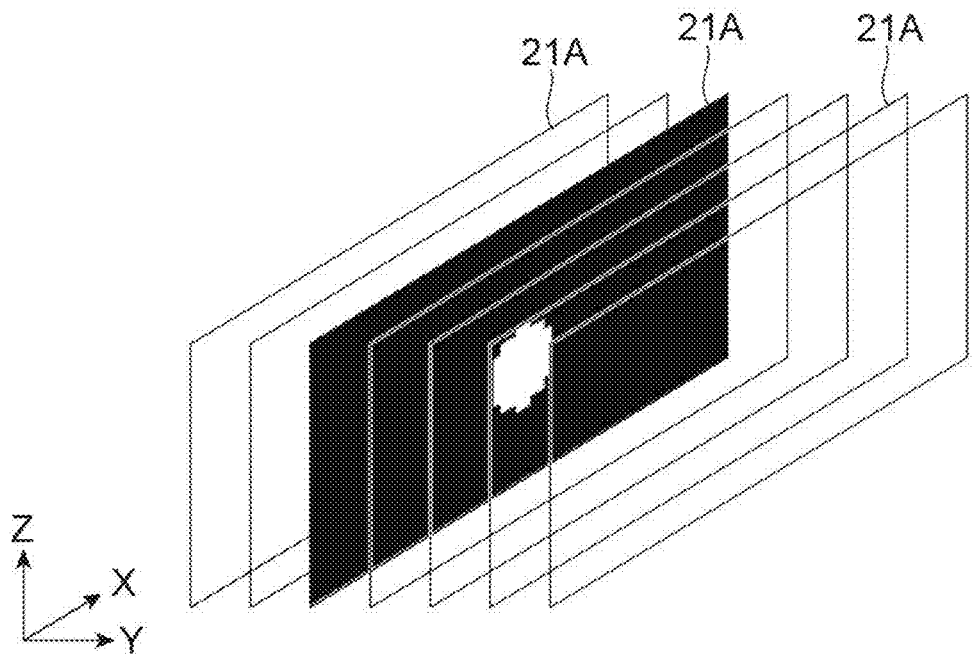
(B)
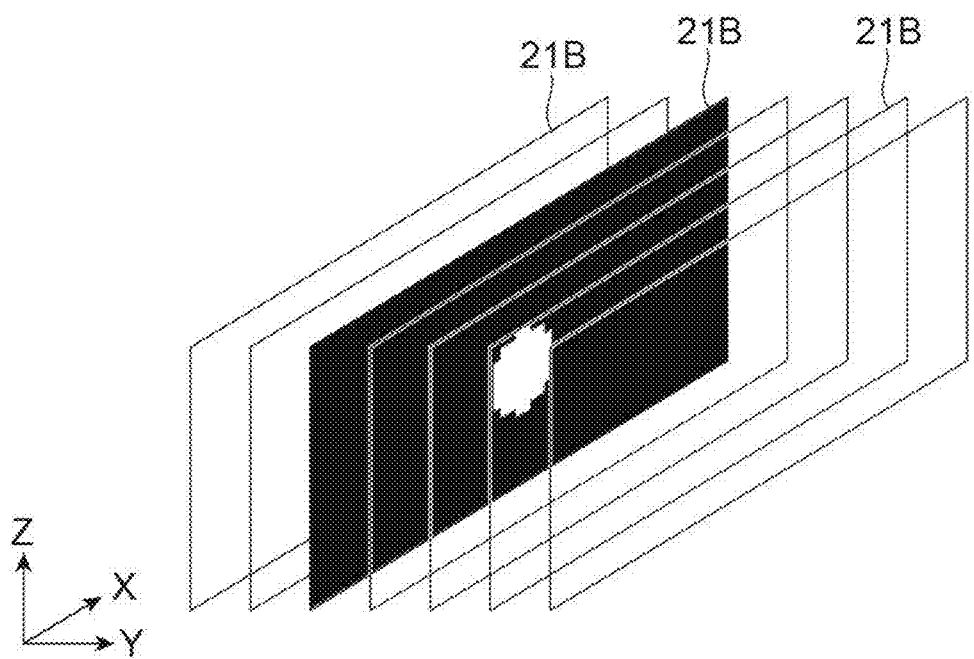

Fig.6
(A)
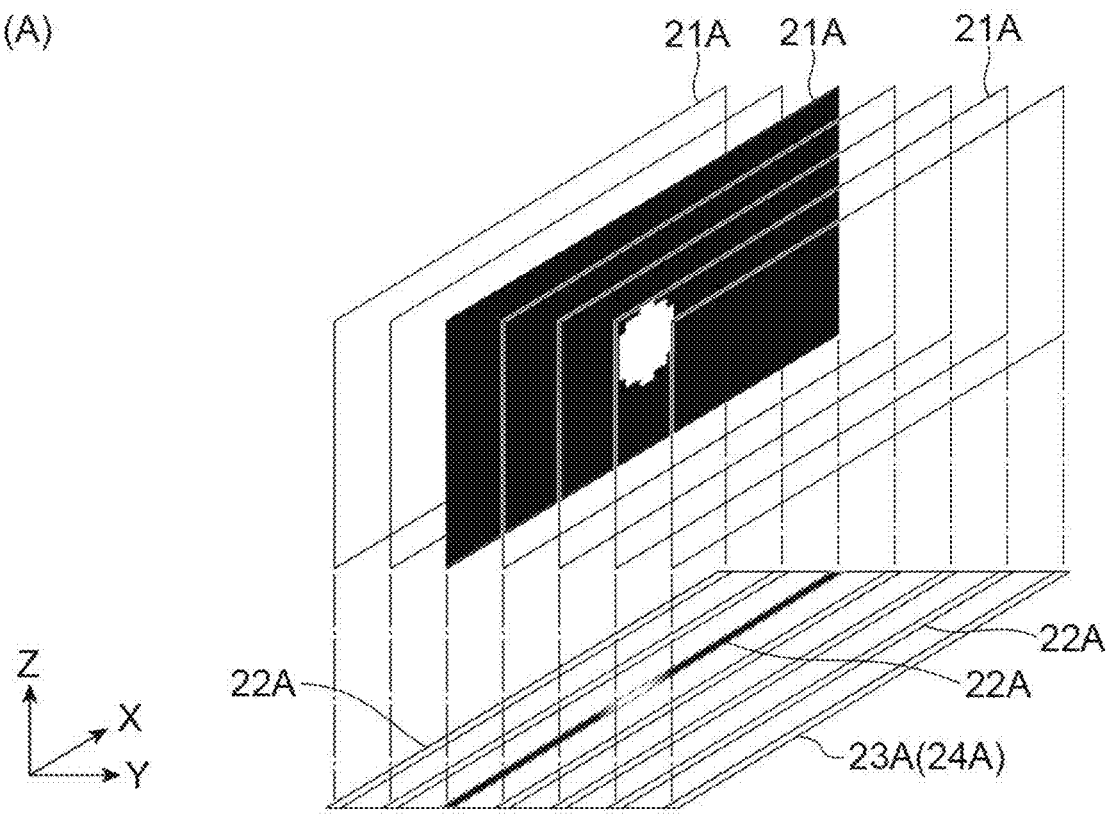
(B)
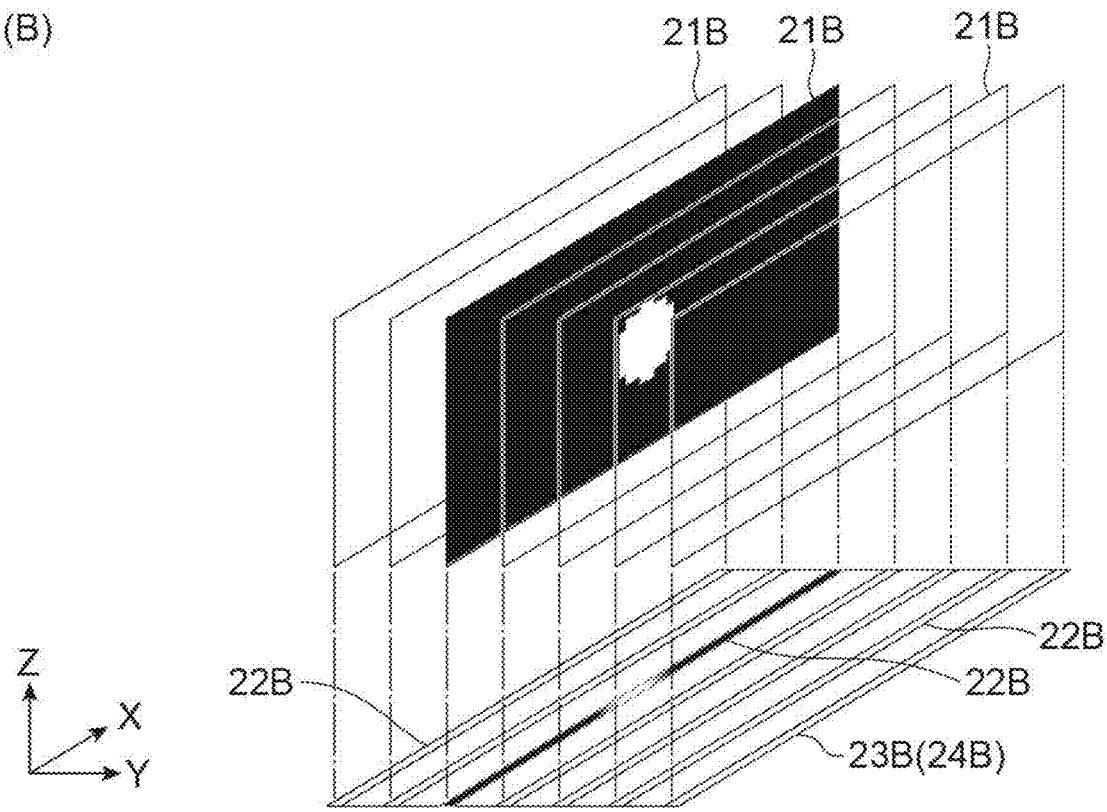

*Fig.8*
(A)
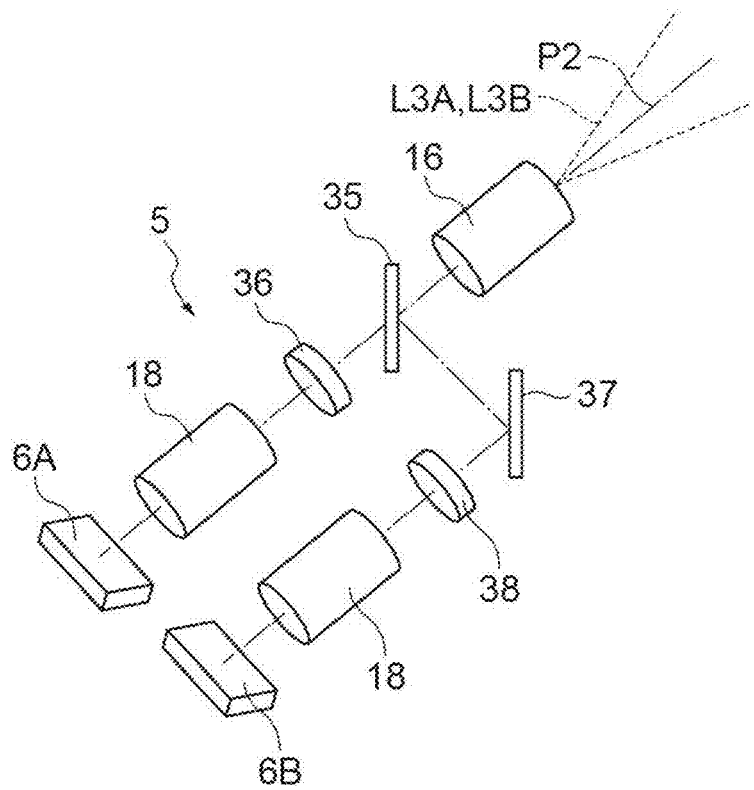
(B)
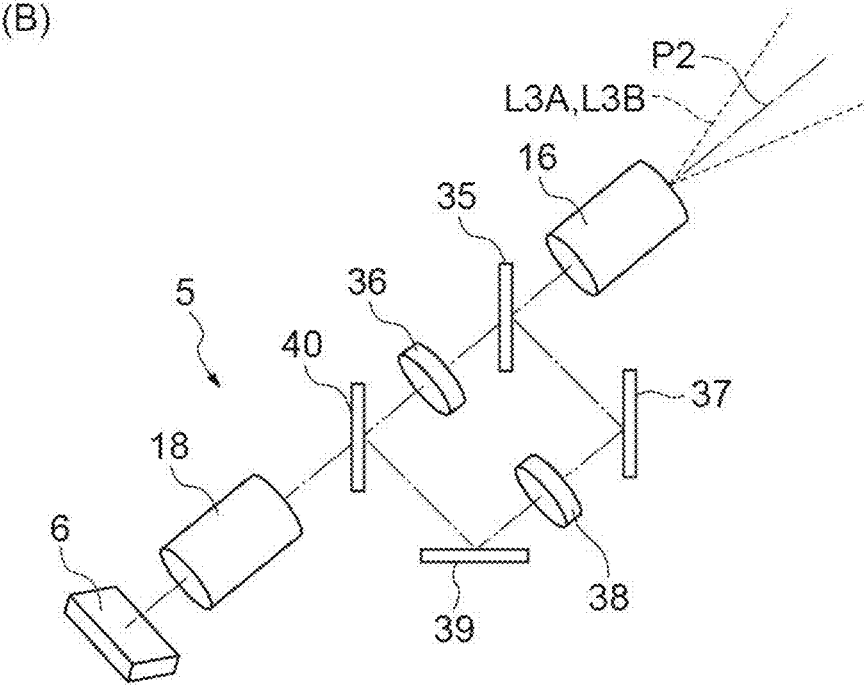

SAMPLE OBSERVATION DEVICE AND SAMPLE OBSERVATION METHOD WITH PLANAR LIGHT HAVING DIFFERENT WAVELENGTHS

TECHNICAL FIELD

The present disclosure relates to a sample observation device and a sample observation method.

BACKGROUND ART

SPIM (Selective Plane Illumination Microscopy) is known as one of techniques for observing the inside of a sample having a three-dimensional stereoscopic structure such as a cell. For example, a tomographic image observation apparatus described in Patent Literature 1 discloses a basic principle of SPIM. In this conventional apparatus, a sample is irradiated with planar light, and fluorescence or scattered light generated inside the sample is imaged on an imaging surface to acquire observation image data inside the sample.

As another sample observation device using planar light, for example, there is a sample observation device described in Patent Literature 2. The sample observation device includes an irradiation optical system that irradiates a sample with planar light, and a scanning unit that scans the sample with respect to an irradiation surface of the planar light. The sample observation device also includes an imaging optical system that has an observation axis inclined with respect to the irradiation surface and images observation light generated in the sample by irradiation with planar light, an image acquiring unit that acquires a plurality of pieces of partial image data corresponding to a part of a light image of the observation light imaged by the imaging optical system, and an image generating unit that generates observation image data of the sample on the basis of the plurality of pieces of partial image data generated by the image acquiring unit.

CITATION LIST

Patent Literature

Patent Literature 1: Japanese Unexamined Patent Publication No. S62-180241
Patent Literature 2: Japanese Unexamined Patent Publication No. 2018-063292

SUMMARY OF INVENTION

Technical Problem

In the sample observation device as described above, depending on the type and state of the sample, it is assumed that it is effective to perform observation by emitting planar light having different wavelengths as compared with the case of using planar light having a single wavelength. However, in an aspect in which scanning of a sample is executed a plurality of times with respect to planar light having different wavelengths, it takes time to obtain observation image data, which is a problem.

The present disclosure has been made to solve the above problem, and an object of the present disclosure is to provide a sample observation device and a sample observation method capable of improving throughput until observation image data is obtained even when a sample is irradiated with planar light having different wavelengths.

Solution to Problem

A sample observation device according to one aspect of the present disclosure includes: an irradiation optical system configured to emit first planar light and second planar light having different wavelengths so as to pass through cross sections at different positions of a sample; a scanning unit configured to scan the sample with respect to a first irradiation surface by the first planar light and a second irradiation surface by the second planar light; an imaging optical system having an observation axis inclined with respect to the first irradiation surface and the second irradiation surface and imaging each of a light image of first observation light generated in the sample by irradiation with the first planar light and a light image of second observation light generated in the sample by irradiation with the second planar light; an image acquiring unit configured to acquire first image data corresponding to the light image of the first observation light imaged by the imaging optical system and second image data corresponding to the light image of the second observation light during scanning of the sample by the scanning unit; and an image generating unit configured to generate observation image data of the sample on a basis of the first image data and the second image data.

In this sample observation device, the first planar light and the second planar light having different wavelengths are emitted so as to pass through cross sections at different positions of the sample. Then, observation image data of the sample is generated on the basis of the first image data and the second image data corresponding to the respective light images of the first observation light and the second observation light generated in the sample by the irradiation with the planar light. Therefore, in this sample observation device, even when the sample is irradiated with planar light having different wavelengths, observation image data of the sample can be acquired by one scan, and throughput until the observation image data is obtained can be improved.

The irradiation optical system may irradiate the sample with the first planar light and the second planar light such that the first irradiation surface and the second irradiation surface are positioned to be shifted in a scanning direction of the sample or a direction according to the scanning direction of the sample. According to this configuration, since the first irradiation surface and the second irradiation surface pass through the same position of the cross section of the sample when the sample is scanned, the first image data and the second image data for the cross section at the same position of the sample can be acquired. Therefore, the observation result of the cross section at the same position of the sample can be obtained for each irradiation of the first planar light and the second planar light.

In a case where the width direction of the planar light is the X axis, the scanning direction of the sample is the Y axis, and the optical axis of the planar light is the Z axis, the image acquiring unit may acquire a plurality of pieces of first XZ image data corresponding to the first image data and a plurality of pieces of second XZ image data corresponding to the second image data, and the image generating unit may generate a plurality of pieces of first X image data obtained by integrating the plurality of pieces of first XZ image data in the Z-axis direction and a plurality of pieces of second X image data obtained by integrating the plurality of pieces of second XZ image data in the Z-axis direction, and may generate observation image data on the basis of first XY image data obtained by combining the plurality of pieces of first X image data in the Y-axis direction and second XY image data obtained by combining the plurality of pieces of second X image data in the Y-axis direction. According to this configuration, it is easy to continuously perform scanning with planar light. In addition, since observation image data with suppressed background can be generated, observation of the sample can be performed with high accuracy.

The image acquiring unit may have an imaging surface divided into a first imaging area for acquiring first image data and a second imaging area for acquiring second image data. As a result, the first image data and the second image data can be acquired on the single imaging surface, and the device can be downsized.

The first imaging area and the second imaging area may be continuous on the imaging surface. In this case, the imaging surface can be efficiently used.

The image generating unit may generate the observation image data in consideration of the number of delayed frames between acquisition of the first image data and acquisition of the second image data in the image acquiring unit. As a result, it is possible to accurately obtain the observation result of the cross section of the sample at the same position with respect to the irradiation of each of the first planar light and the second planar light.

The image generating unit may generate region image data regarding an existing region of the sample in the image using one of the first image data and the second image data, and generate observation image data on the basis of the region image data. In this case, for example, by specifying the existing region of the sample using the image data in which the light image of the observation light is easily obtained, the information on the existing region of the sample can be applied to the analysis of the sample using the image data in which the light image of the observation light is difficult to obtain. Therefore, the observation of the sample can be performed more accurately.

A sample observation method according to one aspect of the present disclosure includes: an irradiation step of emitting first planar light and second planar light having different wavelengths so as to pass through cross sections at different positions of a sample; a scanning step of scanning the sample with respect to a first irradiation surface by the first planar light and a second irradiation surface by the second planar light; an imaging step of imaging a light image of first observation light generated in the sample by irradiation with the first planar light and imaging a second light image of second observation light generated in the sample by irradiation with the second planar light by using an imaging optical system having an observation axis inclined with respect to the first irradiation surface and the second irradiation surface; an image acquiring step of acquiring, during scanning of the sample, each of first image data corresponding to the light image of the first observation light and second image data corresponding to the light image of the second observation light imaged by the imaging optical system; and an image generating step of generating observation image data of the sample on the basis of the first image data and the second image data.

In this sample observation method, the first planar light and the second planar light having different wavelengths are emitted so as to pass through cross sections at different positions of the sample. Then, observation image data of the sample is generated on the basis of the first image data and the second image data corresponding to the respective light images of the first observation light and the second observation light generated in the sample by the irradiation with the planar light. Therefore, in this sample observation method, even when the sample is irradiated with planar light having different wavelengths, observation image data of the sample can be acquired by one scan, and the throughput until the observation image data is obtained can be improved.

In the irradiation step, the sample may be irradiated with the first planar light and the second planar light such that the first irradiation surface and the second irradiation surface are positioned to be shifted in the scanning direction of the sample or the direction according to the scanning direction of the sample. According to this configuration, since the first irradiation surface and the second irradiation surface pass through the same position of the cross section of the sample when the sample is scanned, the first image data and the second image data for the cross section at the same position of the sample can be acquired. Therefore, the observation result of the cross section at the same position of the sample can be obtained for each irradiation of the first planar light and the second planar light.

in a case where the width direction of the planar light is the X axis, the scanning direction of the sample is the Y axis, and the optical axis of the planar light is the Z axis, in the image acquiring step, a plurality of pieces of first XZ image data corresponding to the first image data and a plurality of pieces of second XZ image data corresponding to the second image data are acquired, and in the image generating step, a plurality of pieces of first X image data obtained by integrating the plurality of pieces of first XZ image data in the Z-axis direction and a plurality of pieces of second X image data obtained by integrating the plurality of pieces of second XZ image data in the Z-axis direction are generated, and the observation image data may be generated on the basis of the first XY image data obtained by combining the plurality of pieces of first X image data in the Y-axis direction and the second XY image data obtained by combining the plurality of pieces of second X image data in the Y-axis direction. According to this configuration, it is easy to continuously perform scanning with planar light. In addition, since observation image data with suppressed background can be generated, observation of the sample can be performed with high accuracy.

In the image acquiring step, an imaging surface divided into a first imaging area for acquiring first image data and a second imaging area for acquiring second image data may be used. As a result, the first image data and the second image data can be acquired on the single imaging surface, and the device can be downsized.

The first imaging area and the second imaging area may be continuous on the imaging surface. In this case, the imaging surface can be efficiently used.

In the image generating step, the observation image data may be generated in consideration of the number of delayed frames between the acquisition of the first image data and the acquisition of the second image data. As a result, it is possible to accurately obtain the observation result of the cross section of the sample at the same position with respect to the irradiation of each of the first planar light and the second planar light.

In the image generating step, region image data regarding an existing region of the sample in the image may be generated using one of the first image data and the second image data, and observation image data may be generated on the basis of the region image data. In this case, for example, by specifying the existing region of the sample using the image data in which the light image of the observation light is easily obtained, the information on the existing region of the sample can be applied to the analysis of the sample using the image data in which the light image of the observation light is difficult to obtain. Therefore, the observation of the sample can be performed more accurately.

Advantageous Effects of Invention

According to the present disclosure, even when a sample is irradiated with planar light having different wavelengths, throughput until observation image data is obtained can be improved.

BRIEF DESCRIPTION OF DRAWINGS

FIG. 4(A) is a schematic diagram illustrating XZ image data corresponding to a light image of first observation light, and FIG. 4(B) is a schematic diagram illustrating XZ image data corresponding to a light image of second observation light.

FIG. 6(A) is a schematic view illustrating a state in which XY image data (observation image data) is generated from XZ image data corresponding to a light image of first observation light, and FIG. 6(B) is a schematic view illustrating a state in which XY image data (observation image data) is generated from XZ image data corresponding to a light image of second observation light.

FIGS. 8(A) and 8(B) are schematic views illustrating modifications of an imaging optical system.

DESCRIPTION OF EMBODIMENTS

Hereinafter, preferred embodiments of a sample observation device and a sample observation method according to one aspect of the present disclosure will be described in detail with reference to the drawings.

Figure 1:
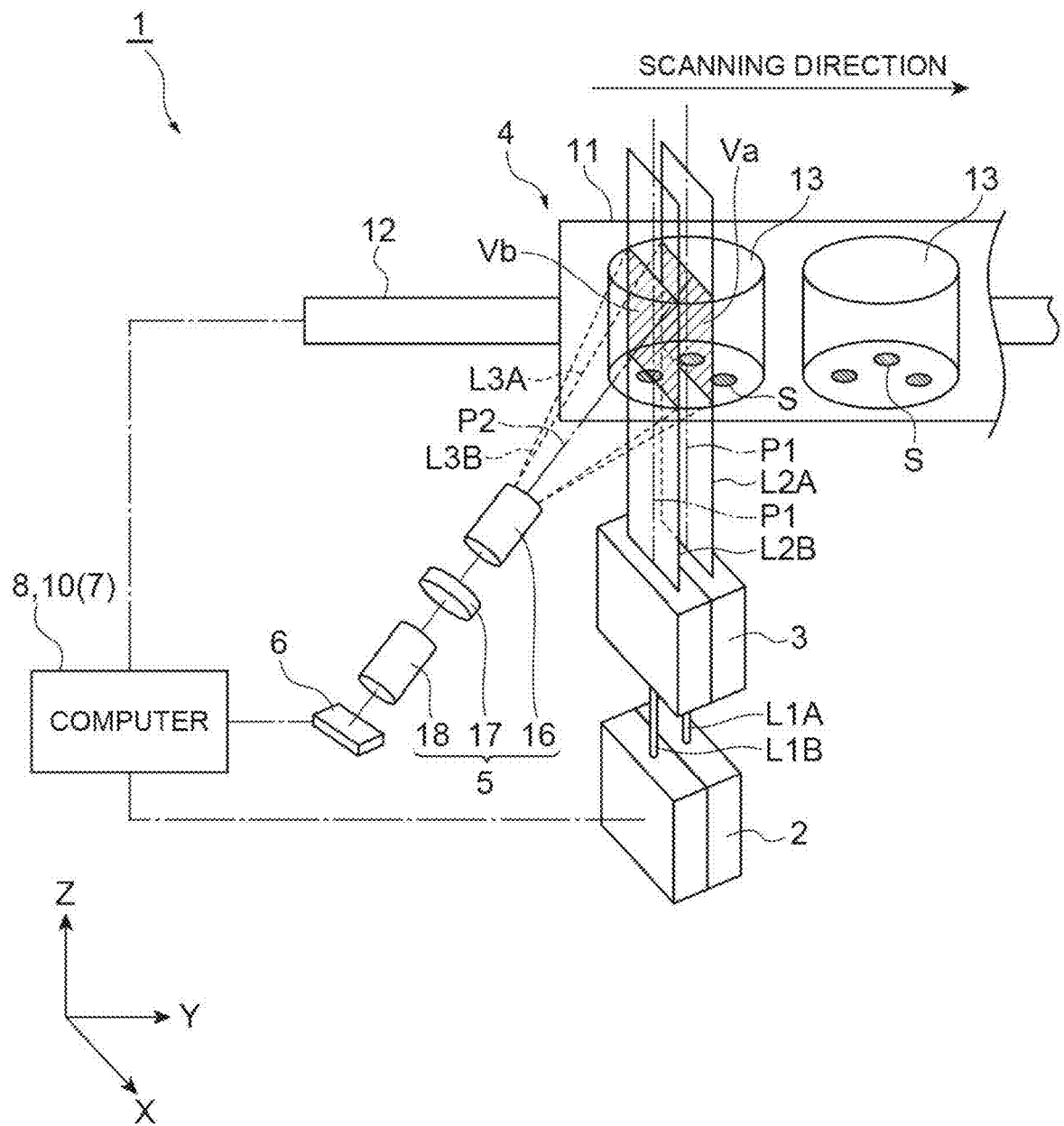
FIG. 1 is a schematic configuration diagram illustrating an embodiment of a sample observation device according to the present disclosure.

FIG. 1 is a schematic configuration diagram illustrating an embodiment of a sample observation device according to the present disclosure. The sample observation device 1 is configured as a device that irradiates the sample S with planar light (first planar light) L2A and planar light (second planar light) L2B having wavelengths different from each other, and images observation light (first observation light) L3A and observation light (second observation light) L3B generated inside the sample S on an imaging surface to acquire observation image data inside the sample S.

Examples of the sample observation device 1 of this type include a slide scanner that acquires and displays an image of the sample S held on a slide glass, a plate reader that acquires image data of the sample S held on a microplate and analyzes the image data, and the like. Examples of the sample S to be observed include human or animal cells, tissues, organs, animals or plants themselves, and plant cells and tissues. In addition, the sample S may be contained in a solution, a gel, or a substance having a refractive index different from that of the sample S.

A light source 2 is a light source that outputs light with which the sample S is irradiated. Examples of the light source 2 include laser light sources such as laser diodes and solid-state laser light sources. The light source 2 may be a light emitting diode, a superluminescent diode, or a lamp-based light source. The light source 2 outputs light L1A that is a source of the planar light L2A and light L1B that is a source of the planar light L2B. The light L1A and the light L1B have different wavelengths. The light source 2 may have a function of switching the wavelength and intensity of each light beam in outputting the light L1A and the light L1B, or may be a combination of separate light sources capable of outputting light beams having different wavelengths. The light L1A, L1B output from the light source 2 is guided to an irradiation optical system 3.

The irradiation optical system 3 is an optical system that shapes the light L1A and the light L1B output from the light source 2 into planar light L2A and planar light L2B, respectively, and irradiates the sample S with the shaped planar light L2A, L2B along an optical axis P1. In the following description, the optical axis P1 of the irradiation optical system 3 may be referred to as an optical axis of the planar light L2A, L2B. The irradiation optical system 3 includes, for example, a light shaping element such as a cylindrical lens, an axicon lens, or a spatial light modulator, and is optically coupled to the light source 2. The irradiation optical system 3 may include an objective lens.

The sample S in a sample container 11 is irradiated with planar light L2A, L2B formed by the irradiation optical system 3. In the sample S irradiated with the planar light L2A, L2B, observation light L3A, L3B is generated on an irradiation surface (first irradiation surface) Va of the planar light L2A and an irradiation surface (second irradiation surface) Vb of the planar light L2B. Examples of the observation light L3A, L3B include fluorescence excited by the planar light L2A, L2B, scattered light of the planar light L2A, L2B, and diffusion reflected light of the planar light L2A, L2B. In the sample observation device 1 of the present embodiment, for example, a multi-excitation single fluorescence observation method is adopted. In this case, the observation light L3A, L3B is fluorescence (autofluorescence or the like) of the same wavelength generated in the sample S by irradiation with the planar light L2A, L2B.

When observation is performed in the thickness direction of the sample S, it is preferable that the planar light L2A, L2B is thin planar light having a thickness of 2 mm or less in consideration of resolution. In addition, in a case where the thickness of the sample S is very small, that is, in a case where the sample S having a thickness equal to or less than the resolution in the Z-axis direction is observed, the thickness of the planar light L2A, L2B does not affect the resolution. Therefore, the planar light L2A, L2B having a thickness exceeding 2 mm may be used.

Figure 2:
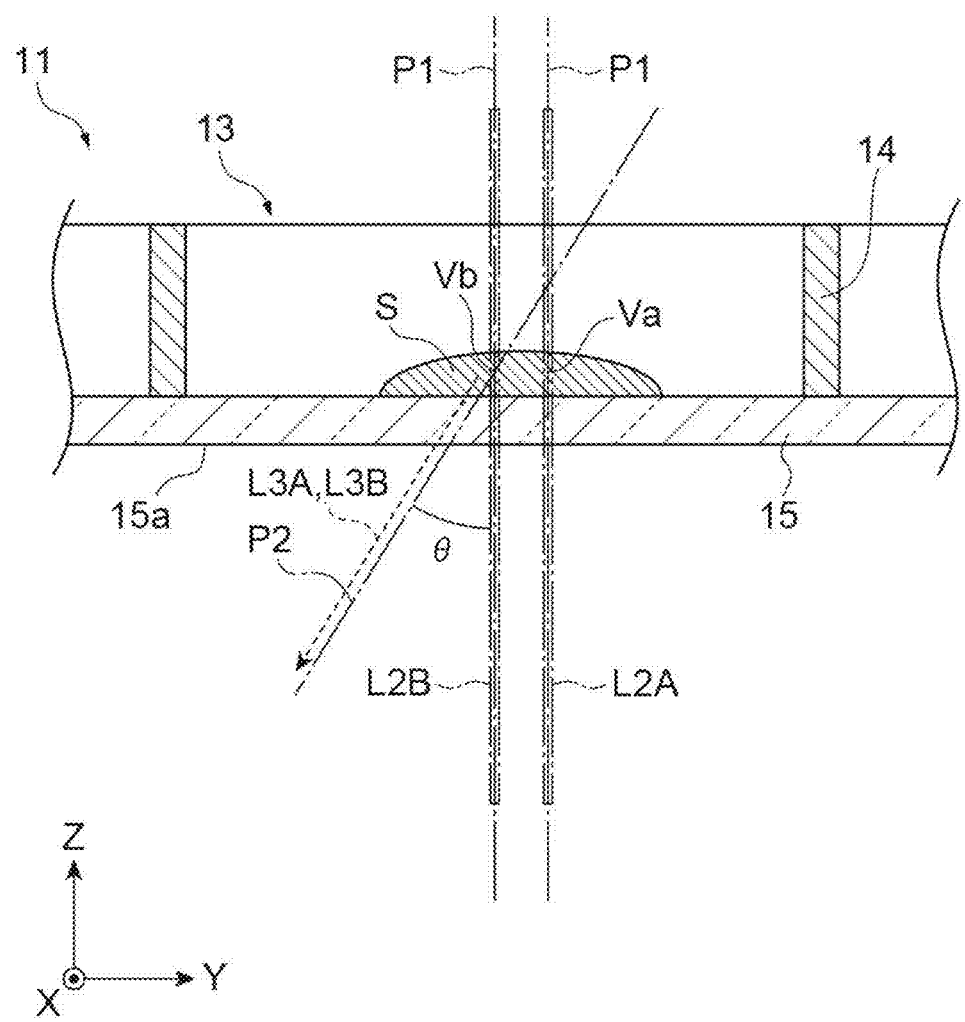
FIG. 2 is an enlarged view of a main part showing the vicinity of a sample.

A scanning unit 4 is a mechanism that scans the sample S with respect to an irradiation surface V of the planar light L2. In the present embodiment, the scanning unit 4 includes a moving stage 12 that moves the sample container 11 holding the sample S. The sample container 11 is, for example, a microplate, a slide glass, a petri dish, or the like. In the present embodiment, a microplate is exemplified. As illustrated in FIG. 2, the sample container 11 includes a plate-shaped main body portion 14 in which a plurality of wells 13 in which the samples S are placed are arranged in a straight line (or in a matrix), and a plate-shaped transparent member 15 provided to close one end sides of the wells 13 on one surface side of the main body portion 14.

When the sample S is placed in the well 13, the well 13 may be filled with a medium such as water. The transparent member 15 has an input surface 15a of the planar light L2A, L2B with respect to the samples S arranged in the well 13. The material of the transparent member 15 is not particularly limited as long as it is a member having transparency to the planar light L2, and is, for example, glass, quartz, or synthetic resin. The sample container 11 is disposed with respect to the moving stage 12 such that the input surface 15a is orthogonal to the optical axis P1 of the planar light L2. The other end sides of the wells 13 are opened to the outside. The sample container 11 may be fixed to the moving stage 12.

As illustrated in FIG. 1, the moving stage 12 scans the sample container 11 at a constant speed in a preset direction in accordance with a control signal from a computer 7. In the present embodiment, the moving stage 12 scans the sample container 11 in one direction in a plane orthogonal to the optical axis P1 of the planar light L2A, L2B. In the following description, the width direction of the planar light L2A, L2B is referred to as an X axis, the scanning direction of the sample S by the scanning unit 4 is referred to as a Y axis, and the optical axis P1 direction of the planar light L2A, L2B is referred to as a Z axis. In the present embodiment, the planar light L2A, L2B is incident on the sample S from the input surface 15a of the well 13 at positions shifted from each other in the Y-axis direction. Therefore, the irradiation surface Va of the planar light L2A and the irradiation surface Vb of the planar light L2B are shifted and positioned in the scanning direction of the sample S. Both the irradiation surface Va of the planar light L2A and the irradiation surface Vb of the planar light L2B with respect to the sample S are surfaces in the XZ plane.

An imaging optical system 5 is an optical system that images the observation light L3A, L3B generated in the sample S by irradiation with the planar light L2A, L2B. The imaging optical system 5 includes, for example, an objective lens 16, a filter 17, a relay lens 18, and the like. In the present embodiment, since the observation light L3A and the observation light L3B are the fluorescence of the same wavelength generated in the sample S, for example, a band pass filter in which the wavelength of the fluorescence becomes the transmission band can be used as the filter 17.

The optical axis of the imaging optical system 5 is the optical axis of the observation light L3A, L3B (hereinafter, "observation axis P2"). The observation axis P2 is inclined at an inclination angle θ with respect to each of the irradiation surfaces Va and Vb of the planar light L2 in the sample S. The inclination angle θ also coincides with an angle formed by the optical axis P1 and the observation axis P2 of the planar light L2A, L2B directed to the sample S. The inclination angle θ is, for example, 10° to 80°. From the viewpoint of improving the resolution of the observation image, the inclination angle θ is preferably 20° to 70°. In addition, the inclination angle θ is more preferably 30° to 65° from the viewpoint of improving the resolution of the observation image and the stability of the visual field.

An image acquiring unit 6 is a device that acquires first image data corresponding to a light image of the observation light L3A imaged by the imaging optical system 5 during scanning of the sample S and second image data corresponding to a light image of the observation light L3B. The image acquiring unit 6 includes, for example, an imaging device that images a light image of the observation light L3A, L3B. Examples of the imaging device include area image sensors such as a CMOS image sensor and a CCD image sensor. These area image sensors are arranged on an imaging surface by the imaging optical system 5, and output two-dimensional image data to the computer 7. The reading method of the imaging device may be a global shutter method in which the exposure periods of the pixel columns coincide with each other, or may be a rolling shutter method in which the exposure periods of the pixel columns are shifted by a predetermined time.

Figure 5:
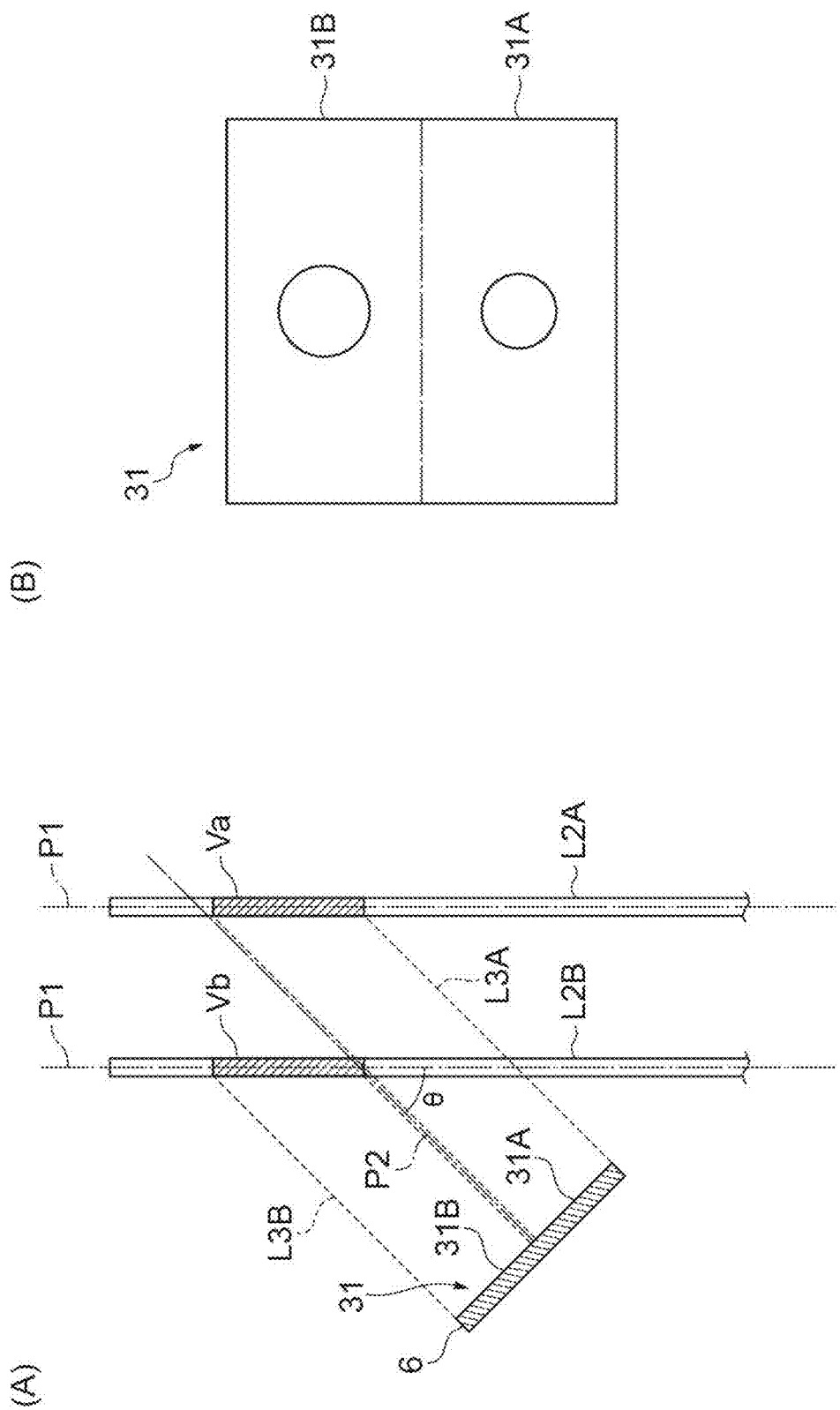
FIG. 5(A) is a schematic diagram illustrating a positional relationship between first observation light and second observation light directed to an imaging surface.
FIG. 5(B) is a schematic diagram illustrating a first imaging area and a second imaging area of the imaging surface.

The image acquiring unit 6 includes an imaging surface 31 that captures a light image of the observation light L3A, L3B (see FIGS. 5(A) and 5(B)). The imaging surface 31 is divided into two areas of a first imaging area 31A for acquiring first image data and a second imaging area 31B for acquiring second image data. In the present embodiment, both the first imaging area 31A and the second imaging area 31B are rectangular regions, and are continuous on the imaging surface 31.

The computer 7 physically includes a memory such as a RAM and a ROM, a processor (arithmetic circuit) such as a CPU, a communication interface, a storage unit such as a hard disk, and a display unit such as a display. Examples of the computer 7 include a personal computer, a cloud server, and a smart device (smartphone, tablet terminal, etc.). The computer 7 functions as a controller that controls the operations of the light source 2 and the moving stage 12, an image generating unit 8 that generates observation image data of the sample S, and an analysis unit 10 that analyzes the observation image data by executing a program stored in the memory by the CPU of the computer system.

The computer 7 as a controller receives an input of a measurement start operation by the user, and synchronously drives the light source 2, the scanning unit 4, and the image acquiring unit 6. In this case, the computer 7 may control the light source 2 so that the light source 2 continuously outputs the light L1A, L1B during the movement of the sample S by the moving stage 12, or may control ON/OFF of the output of the light L1A, L1B by the light source 2 in accordance with the imaging by the image acquiring unit 6. When the irradiation optical system 3 includes an optical shutter (not illustrated), the computer 7 may turn on/off the irradiation of the sample S with the planar light L2A, L2B by controlling the optical shutter.

The computer 7 as the image generating unit 8 generates observation image data of the sample S on the basis of the image data generated by the image acquiring unit 6. On the basis of the image data output from the image acquiring unit 6, the image generating unit 8 generates observation image data of the sample S on a plane (XY plane) orthogonal to the optical axis P1 of the planar light L2A, L2B, for example. The image generating unit 8 executes storage of the generated observation image data, display on a monitor, and the like in accordance with a predetermined operation by the user, for example.

Figure 3:
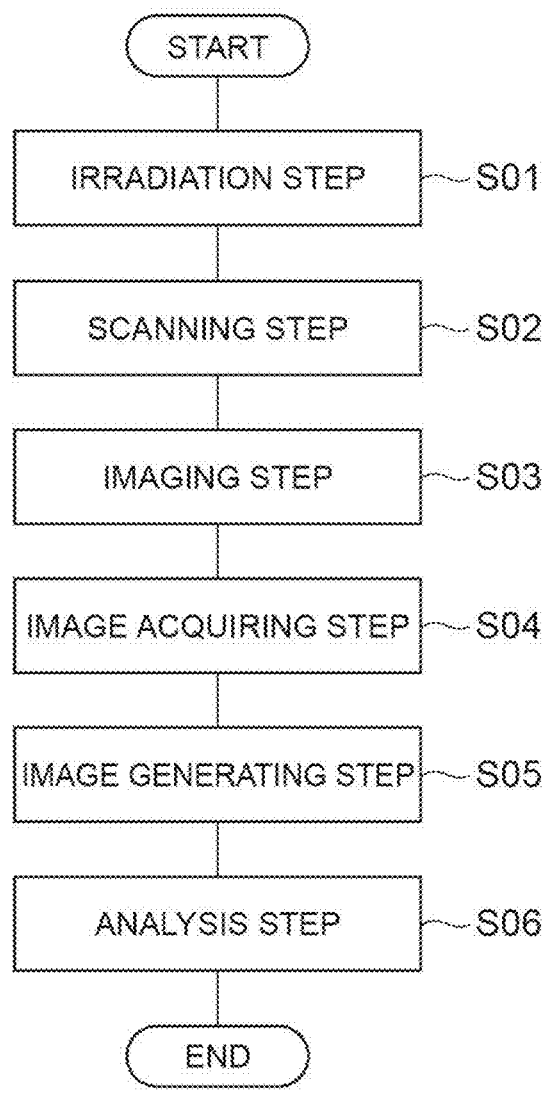
FIG. 3 is a flowchart illustrating an example of a sample observation method using the sample observation device illustrated in FIG. 1.

FIG. 3 is a flowchart illustrating an example of a sample observation method using the sample observation device. As shown in the figure, this sample observation method includes an irradiation step (step S01), a scanning step (step S02), an imaging step (step S03), an image acquiring step (step S04), an image generating step (step S05), and an analysis step (step S06).

In the irradiation step S01, the sample S is irradiated with the planar light L2A, L2B such that the irradiation surface Va of the planar light L2A and the irradiation surface Vb of the planar light L2B with respect to the sample S are positioned to be shifted from each other in the scanning direction of the sample S. When a measurement start operation is input by the user, the light source 2 is driven on the basis of a control signal from the computer 7, and the light L1A, L1B is output from the light source 2. The light L1A, L1B output from the light source 2 is shaped by the irradiation optical system 3 to become planar light L2A, L2B, and the sample S is irradiated such that the planar light passes through cross sections at different positions of the sample S.

In the scanning step S02, the sample S is scanned with respect to the irradiation surface Va of the planar light L2A and the irradiation surface Vb of the planar light L2B. When a measurement start operation is input by the user, the moving stage 12 is driven in synchronization with the driving of the light source 2 on the basis of a control signal from the computer 7. As a result, the sample container 11 is linearly driven at a constant speed in the Y-axis direction, and the sample S in the well 13 is scanned with respect to the irradiation surface Va, Vb of the planar light L2A, L2B. Here, the irradiation surface Va is positioned on the front side in the scanning direction, and the irradiation surface Vb is positioned on the back side in the scanning direction. Therefore, the scanning of the cross section at a certain position of the sample S by the planar light L2A precedes the scanning of the cross section of the sample S by the planar light L2B in terms of time.

In the imaging step S03, the observation light L3A, L3B generated in the sample S by the irradiation with the planar light L2A, L2B is imaged on the imaging surface of the image acquiring unit 6 using the imaging optical system 5 having the observation axis P2 inclined with respect to the irradiation surface V. In the image acquiring step S04, a plurality of pieces of first image data corresponding to the light image of the observation light L3A imaged by the imaging optical system 5 during the scanning of the sample S are acquired in the Y-axis direction. In addition, a plurality of pieces of second image data corresponding to the light image of the observation light L3B imaged by the imaging optical system 5 during the scanning of the sample S are acquired in the Y-axis direction.

More specifically, in the image acquiring step S04, as illustrated in FIG. 4(A), a plurality of pieces of XZ image data (first image data) 21A corresponding to the light image of the observation light L3A are acquired in the Y-axis direction. As illustrated in FIG. 4(B), a plurality of pieces of XZ image data (second image data) 21B corresponding to the light image of the observation light L3B are acquired in the Y-axis direction. The plurality of pieces of acquired XZ image data 21A and the plurality of pieces of acquired XZ image data 21B are sequentially output from the image acquiring unit 6 to the image generating unit 8.

As described above, in the sample observation device 1, the sample S is irradiated with the planar light L2A, L2B so that the irradiation surface Va, Vb is positioned to be shifted in the scanning direction of the sample S. The imaging optical system 5 has an observation axis P2 inclined with respect to the irradiation surface Va, Vb. Therefore, as illustrated in FIG. 5(A), the observation light L3A generated on the irradiation surface Va of the planar light L2A and the observation light L3B generated on the irradiation surface Vb of the planar light L2B are guided to the image acquiring unit 6 in a state of being shifted from each other in the direction orthogonal to the observation axis P2.

On the imaging surface 31 of the image acquiring unit 6, as illustrated in FIG. 5(B), the XZ image data 21A corresponding to the light image of the observation light L3A is acquired in the first imaging area 31A, and the XZ image data 21B corresponding to the light image of the observation light L3B is acquired in the second imaging area 31B. In the example of FIG. 5(B), the light image acquired in the first imaging area 31A and the light image acquired in the second imaging area 31B are aligned in the direction corresponding to the Z-axis direction of the cross section of the sample S.

In the image generating step S05, observation image data of the sample S is generated on the basis of the plurality of pieces of XZ image data 21. Here, as illustrated in FIG. 6(A), the luminance values of the pixels included in the plurality of pieces of XZ image data 21A obtained in the image acquiring step S04 are integrated in the Z-axis direction to generate a plurality of pieces of X image data (first X image data) 22A. Then, XY image data (first XY image data) 23A is generated by combining the plurality of pieces of X image data 22A in the Y-axis direction.

As illustrated in FIG. 6(B), the luminance values of the pixels included in the plurality of pieces of XZ image data 21B obtained in the image acquiring step S04 are integrated in the Z-axis direction to generate a plurality of pieces of X image data (second X image data) 22B. Then, XY image data (second XY image data) 23B is generated by combining the plurality of pieces of X image data 22B in the Y-axis direction. Each of the XY image data 23A, 23B becomes observation image data 24A, 24B indicating an XY cross-sectional image having an arbitrary thickness at an arbitrary position in the Z-axis direction in the sample S.

In generating the X image data 22A, 22B, the luminance value of each pixel in an arbitrary range in the Z-axis direction in the plurality of pieces of XZ image data 21A, 21B may be integrated in the Z-axis direction. In generating the XY image data 23A, 23B from the plurality of pieces of X image data 22A, 22B, the XY image data 23A, 23B may be directly generated by reconstructing the plurality of pieces of X image data 22A, 22B.

As described above, in the sample observation device 1, the irradiation surface Va is positioned on the front side in the scanning direction, and the irradiation surface Vb is positioned on the back side in the scanning direction, and the scanning of the sample S by the planar light L2A precedes the scanning of the sample S by the planar light L2B in terms of time. Therefore, in the image acquiring unit 6, the timing of acquiring the XZ image data 21B at any position of the sample S is delayed by a predetermined number of frames from the timing of acquiring the XZ image data 21A at the same position of the sample S.

Figure 7:
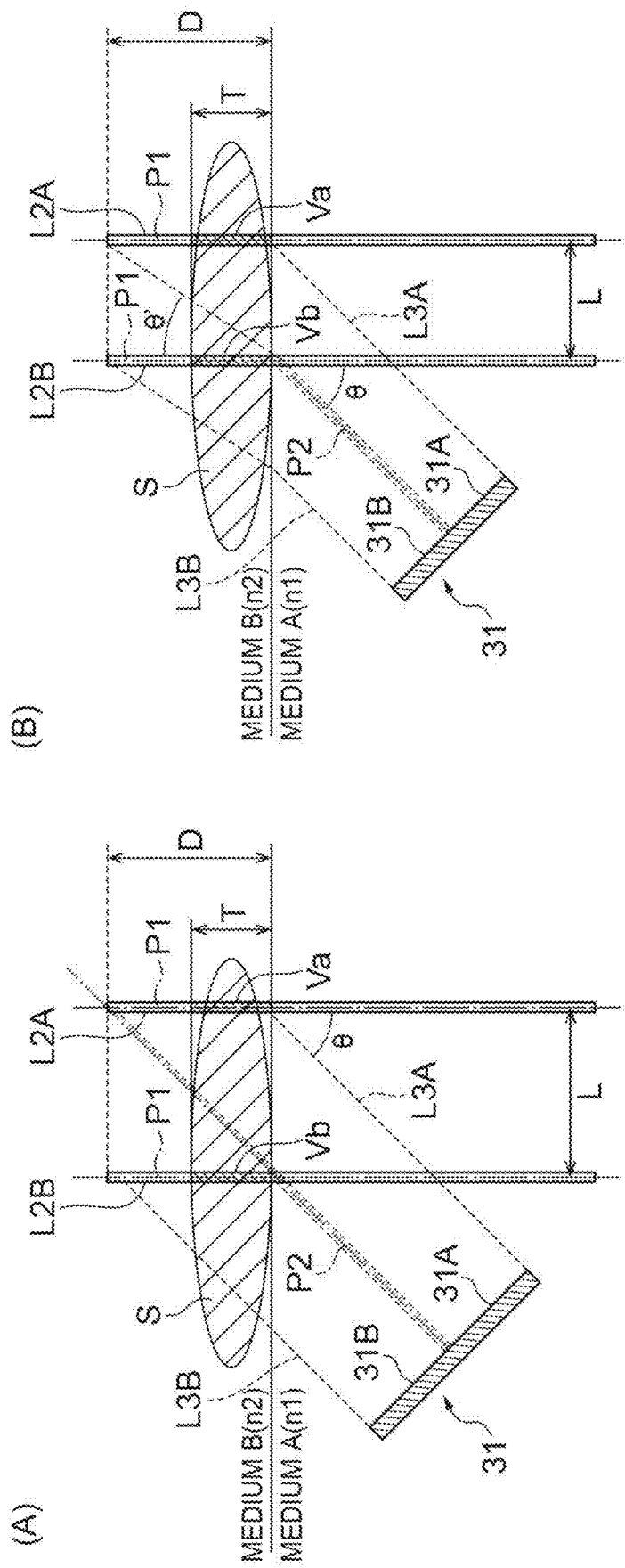
FIG. 7 is a schematic diagram illustrating parameters used for calculating the number of delayed frames.

FIGS. 7(A) and 7(B) are diagrams illustrating examples of calculating the number of delayed frames. Any of these calculation examples assumes that the thickness T of the sample S in the Z-axis direction is smaller than the observation depth D of the planar light L2A, L2B. The observation depth D corresponds to the length in the Z-axis direction of the planar light L2A, L2B that can be observed in the first imaging area 31A and the second imaging area 31B of the imaging surface 31. FIG. 7(A) illustrates a case where the refractive index n1 of the medium A in which the imaging optical system 5 and the image acquiring unit 6 are positioned is equal to the refractive index n2 of the medium B in which the irradiation surface Va of the planar light L2A and the irradiation surface Vb of the planar light L2B are positioned. In this case, when the distance in the Y-axis direction between the planar light L2A and the planar light L2B is L, the inclination angle of the observation axis P2 with respect to the irradiation surface Va, Vb is θ, and the resolution in the scanning direction is $Y_{reso}$, the number of delayed frames Δf can be obtained by $\Delta f = L/Y_{reso}$. L can be obtained by L≥D×tan θ.

FIG. 7(B) illustrates a case where the refractive index n1 of the medium A in which the imaging optical system 5 and the image acquiring unit 6 are positioned is larger than the refractive index n2 of the medium B in which the irradiation surface Va of the planar light L2A and the irradiation surface Vb of the planar light L2B are positioned. Also, in this case, the number of delayed frames Δf can be obtained by $\Delta f = L/Y_{reso}$. L can be obtained by L≥D×tan θ' and sin θ'=(n1/n2) sin θ when the refractive index at the boundary surface between the media A and B is θ'.

In both cases of FIGS. 7(A) and 7(B), the timing of acquiring the XZ image data 21B for the same position of the sample S is delayed from the timing of acquiring the XZ image data 21A depending on the distance L between the planar light L2A and the planar light L2B and the resolution $Y_{reso}$ in the scanning direction. Therefore, when the frame in which the n-th XZ image data 21A is acquired is f(n), by associating the f(n+Δf)-th XZ image data 21B with the n-th XZ image data 21A, it is possible to accurately obtain the observation result of the cross section at the same position of the sample S with respect to the irradiation of each of the planar lights L2A and L2B.

As described above, in the sample observation device 1, the planar light L2A and the planar light L2B having different wavelengths are emitted so as to pass through the cross sections at different positions of the sample S. Then, the observation image data 24A, 24B of the sample S is generated on the basis of the first image data corresponding to the light image of the observation light L3A generated in the sample S by the irradiation with the planar light L2A, L2B and the second image data corresponding to the light image of the observation light L3B. Therefore, in the sample observation device 1, even when the sample S is irradiated with the planar light L2A and the planar light L2B having different wavelengths, the observation image data 24A, 24B of the sample S can be acquired by one scan, and the throughput until the observation image data 24A, 24B is obtained can be improved.

In the sample observation device 1, the sample S is irradiated with the planar light L2A, L2B so that the irradiation surface Va, Vb is positioned to be shifted in the scanning direction of the sample S. As a result, since the irradiation surfaces Va and Vb pass through the same position of the cross section of the sample S when the sample S is scanned, the first image data and the second image data for the cross section at the same position of the sample S can be acquired. Therefore, the observation result of the cross section at the same position of the sample S can be obtained for each irradiation of the planar lights L2A and L2B.

The sample observation device 1 acquires a plurality of pieces of XZ image data 21A corresponding to the first image data and a plurality of pieces of XZ image data 21B corresponding to the second image data, and generates a plurality of pieces of X image data 22A obtained by integrating the plurality of pieces of XZ image data 21A in the Z-axis direction and a plurality of pieces of X image data 22B obtained by integrating the plurality of pieces of XZ image data 21B in the Z-axis direction. Then, the observation image data 24A and the observation image data 24B are generated on the basis of the XY image data 23A obtained by combining the plurality of pieces of X image data 22A in the Y-axis direction and the XY image data 23B obtained by combining the plurality of pieces of X image data 22B in the Y-axis direction. According to this configuration, it is easy to continuously perform scanning with the planar light L2A, L2B. In addition, since the observation image data 24A, 24B with suppressed background can be generated, the observation of the sample S can be performed with high accuracy.

In the sample observation device 1, the image acquiring unit 6 has an imaging surface 31 divided into a first imaging area 31A for acquiring first image data and a second imaging area 31B for acquiring second image data. As a result, the first image data and the second image data can be acquired by the single imaging surface 31, and the device can be downsized. In the present embodiment, the first imaging area 31A and the second imaging area 31B are continuous on the imaging surface 31. As a result, the imaging surface 31 can be efficiently used.

Note that the first imaging area 31A and the second imaging area 31B are not necessarily continuous on the imaging surface 31. That is, one or a plurality of pixel columns that do not contribute to imaging of a light image may exist between the first imaging area 31A and the second imaging area 31B. In addition, the first imaging area 31A and the second imaging area 31B may partially overlap each other on the imaging surface 31.

The present disclosure is not limited to the above embodiments. For example, in the above embodiment, the observation method of the sample observation device 1 is the multi-excitation single fluorescence, and the fluorescence of the same wavelength generated in the sample S is the observation light L3A, L3B, but the observation method of the sample observation device 1 is not limited thereto, and may be, for example, the multi-excitation multi-fluorescence. In a case where the observation method is multi-excitation multi-fluorescence, the filter 17 of the imaging optical system 5 may be configured by a multi-band pass filter having a plurality of transmission bands instead of the band pass filter.

In addition, in a case where the observation method is multi-excitation multi-fluorescence, for example, as illustrated in FIG. 8(A), the imaging optical system 5 that causes a dichroic mirror 35 to branch the observation light L3A, L3B may be adopted. In the example of FIG. 8(A), the image acquiring units 6A and 6B are arranged corresponding to the branched observation light L3A, L3B. In this case, the observation light L3A, L3B passing through the objective lens 16 is branched by the dichroic mirror 35. One branched observation light L3A, L3B enters the image acquiring unit 6A via a band pass filter 36 and the relay lens 18. The other branched observation light L3A, L3B is reflected by a mirror 37 and enters the image acquiring unit 6B via a band pass filter 38 and the relay lens 18. According to such a configuration, since fluorescence images having different wavelengths can be selected by the band pass filters 36 and 38, the sample S can be observed in more detail. Note that one or both of the band pass filters 36 and 38 may be a multi-band pass filter.

In addition, for example, as illustrated in FIG. 8(B), a single image acquiring unit 6 may be arranged in the imaging optical system 5 that causes the dichroic mirror 35 to branch the observation light L3A, L3B. One observation light L3A, L3B branched by the dichroic mirror 35 enters the image acquiring unit 6 via the band pass filter 36 and the relay lens 18. The other observation light L3A, L3B branched by the dichroic mirror 35 is reflected by the mirror 37 and passes through the band pass filter 38. Thereafter, the other observation light L3A, L3B is reflected by a mirror 39, is multiplexed with the one observation light L3A, L3B by a dichroic mirror 40 at the subsequent stage of the band pass filter 36, and enters the image acquiring unit 6 via the relay lens 18. As in the case of FIG. 8(A), one or both of the band pass filters 36 and 38 may be a multi-band pass filter.

Even in such a configuration, since the band pass filter 36, 38 enables selection of fluorescent images having different wavelengths, the sample S can be observed in more detail. Note that, in a case where the configuration of FIG. 8(B) is adopted, the first imaging area 31A and the second imaging area 31B for acquiring the light image of the one branched observation light L3A, L3B, and the first imaging area 31A and the second imaging area 31B for acquiring the light image of the other branched observation light L3A, L3B may be set on the imaging surface 31 of the image acquiring unit 6. As a result, it is possible to acquire each of the first image data and the second image data of fluorescent images having different wavelengths on the single imaging surface 31.

In addition, the sample observation device 1 may generate region image data regarding an existing region of the sample S in the image using one of the first image data and the second image data, and generate observation image data on the basis of the region image data. For example, in a case where a plurality of fluorescent images of the sample S are observed, it is assumed that the observation light L3A, L3B include the one with which it is easy to obtain a light image and the one with which it is difficult to obtain a light image depending on the type of the fluorescent substance. In addition, in general, since the intensity of fluorescence such as autofluorescence tends to be weaker than the intensity of scattered light, it is considered that it is relatively difficult to obtain a light image of a fluorescence image in a case where one of the observation light L3A and the observation light L3B is scattered light and the other is fluorescence. In such a case, by generating the region image data using the observation light with which it is easier to obtain the light image among the observation light L3A and the observation light L3B and extracting region information of the sample S, it is possible to facilitate the analysis of the sample S in the case of using the observation light that is harder to obtain the light image.

Specifically, in a case where the observation light with which it is easy to obtain a light image is the observation light L3A and the observation light with which it is difficult to obtain a light image is the observation light L3B, first, the observation image data 24A is generated on the basis of a plurality of pieces of XZ image data 21A corresponding to the observation light L3A. Next, information (for example, region information and luminance information) X regarding the existing region of the sample S is extracted on the basis of the observation image data 24A. Thereafter, the observation image data 24B is generated on the basis of the plurality of pieces of XZ image data 21B corresponding to the observation light L3B, and the analysis of the sample S based on the observation image data 24B is executed by using the previously extracted information X.

Figure 9:
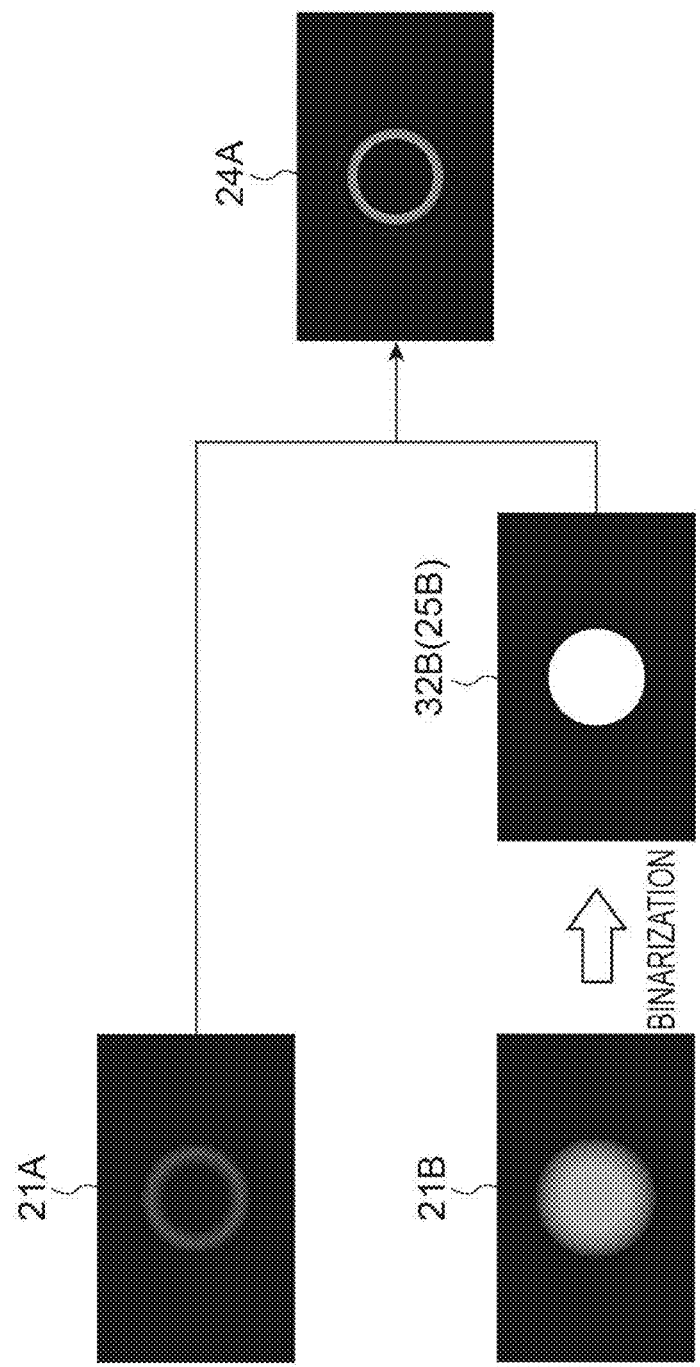
FIG. 9 is a schematic view illustrating an example of generation of observation image data based on XZ image data.

In the example of FIG. 9, the sample observation device 1 acquires a plurality of pieces of XZ image data 21A of the observation light L3A and acquires a plurality of pieces of XZ image data 21B of the observation light L3B. Next, each piece of XZ image data 21B is binarized to generate a plurality of pieces of binarized XZ image data 25B. Then, on the basis of the plurality of pieces of binarized XZ image data 25B, region image data 32B related to the existing region of the sample S is generated. In the example of FIG. 9, the entire binarized XZ image data 25B is set as the region image data 32B. The pixel corresponding to the region image data 32B is extracted from each piece of XZ image data 21A of the observation light L3A, and the observation image data 24A is generated.

Figure 10:
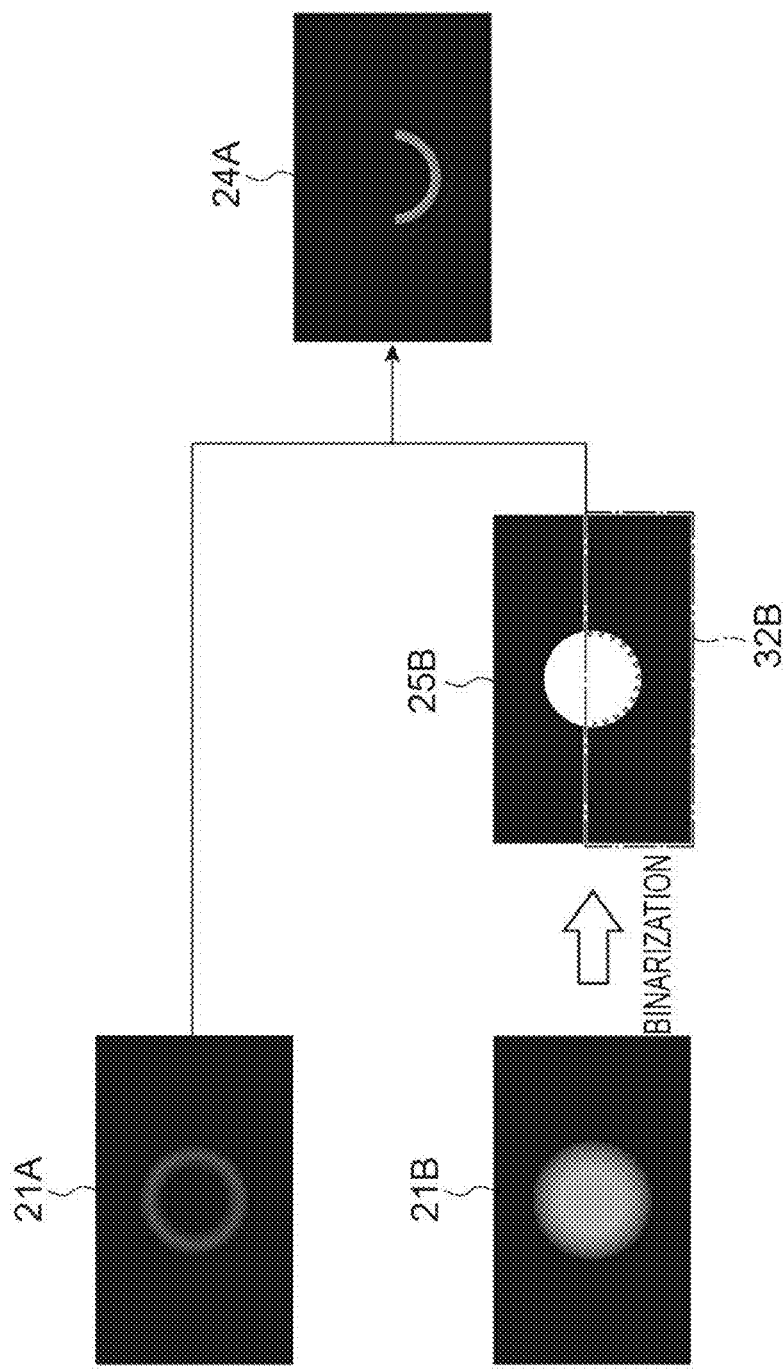
FIG. 10 is a schematic diagram illustrating another example of generation of observation image data based on XZ image data.
Figure 11:
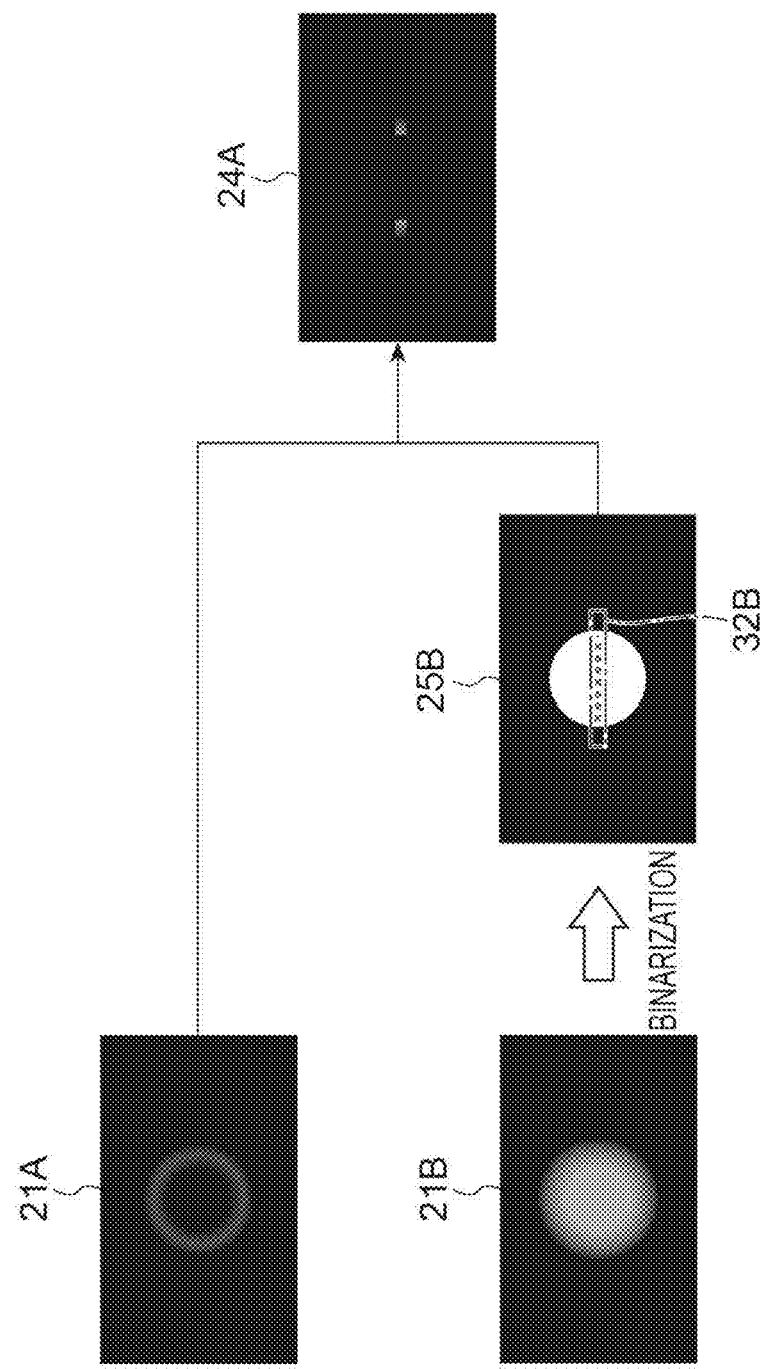
FIG. 11 is a schematic diagram illustrating still another example of generation of observation image data based on XZ image data.

In the example of FIG. 10, only the bottom region of each piece of binarized XZ image data 25B obtained from the XZ image data 21B of the observation light L3B is selectively set as the region image data 32B. A pixel corresponding to the bottom region is extracted from each piece of XZ image data 21A corresponding to the observation light L3A, and the observation image data 24A is generated. In the example of FIG. 11, an arbitrary region (here, the center region) based on each piece of binarized XZ image data 25B obtained from the XZ image data 21B of the observation light L3B is selectively set as the region image data 32B. A pixel corresponding to the arbitrary region is extracted from each piece of XZ image data 21A corresponding to the observation light L3A, and the observation image data 24A is generated.

Figure 12:
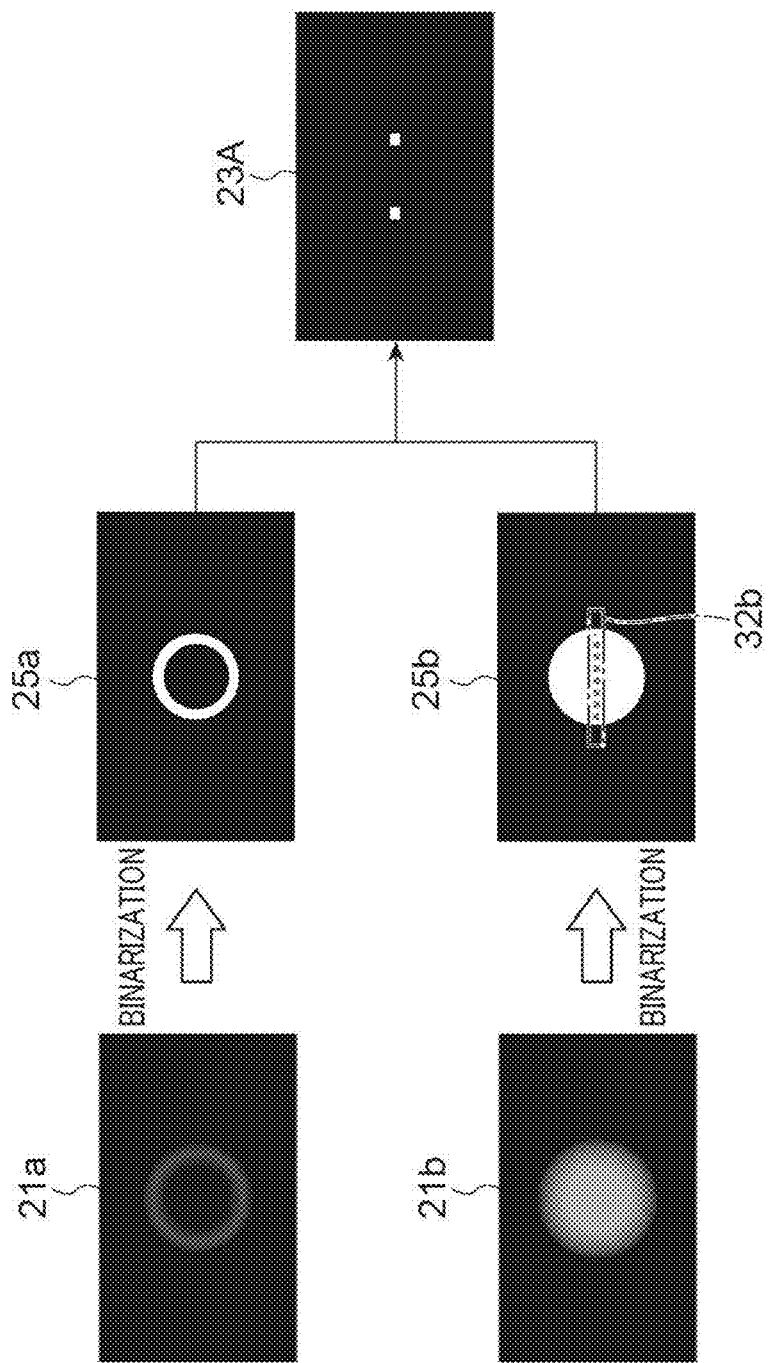
FIG. 12 is a schematic diagram illustrating still another example of generation of observation image data based on XZ image data.

In the example of FIG. 12, a plurality of pieces of XZ image data 21A of the observation light L3A are acquired, and a plurality of pieces of XZ image data 21B of the observation light L3B are acquired. Each piece of XZ image data 21A of the observation light L3A is binarized to generate a plurality of pieces of first binarized XZ image data 25A as luminance image data. In addition, each piece of XZ image data 21B of the observation light L3B is binarized to generate a plurality of pieces of second binarized XZ image data 25B. Then, on the basis of the plurality of second binarized XZ image data 25B, region image data 32B related to the existing region of the sample S is generated. In the example of FIG. 12, an arbitrary region (here, the center region) based on each piece of second binarized XZ image data 25B is selectively set as the region image data 32B. Then, a pixel corresponding to the region image data 32B is extracted from each piece of the first binarized XZ image data 25A corresponding to the observation light L3A, and the observation image data 24A is generated.

In each example of FIGS. 9, 10, 11, and 12, a plurality of pieces of observation image data 24A, which are XZ images, may be integrated in the Z-axis direction to generate a plurality of pieces of X image data 24B. Thereafter, new observation image data 24D may be generated on the basis of XY image data 24C obtained by combining the plurality of pieces of X image data 24B in the Y-axis direction.

In the examples of FIGS. 9, 10, 11, and 12, the observation light L3A and the observation light L3B may be any of fluorescence excited by the planar light L2A, L2B, scattered light of the planar light L2A, L2B, or diffusion reflected light of the planar light L2A, L2B. The observation light L3A and the observation light L3B may be configured by combining different types of light. For example, fluorescence excited by the planar light L2A may be used as the observation light L3A, and scattered light of the planar light L2B may be used as the observation light L3B.

For example, in the above embodiment, the scanning unit 4 scans the sample container 11 in the Y-axis direction by the moving stage 12, but the mode of scanning by the scanning unit 4 is not limited thereto. For example, as in the sample observation device 1 illustrated in FIG. 13, the scanning unit 4 may have a rotation shaft 51 that rotates the sample container 11 about the central axis instead of the moving stage 12.

Figure 13:
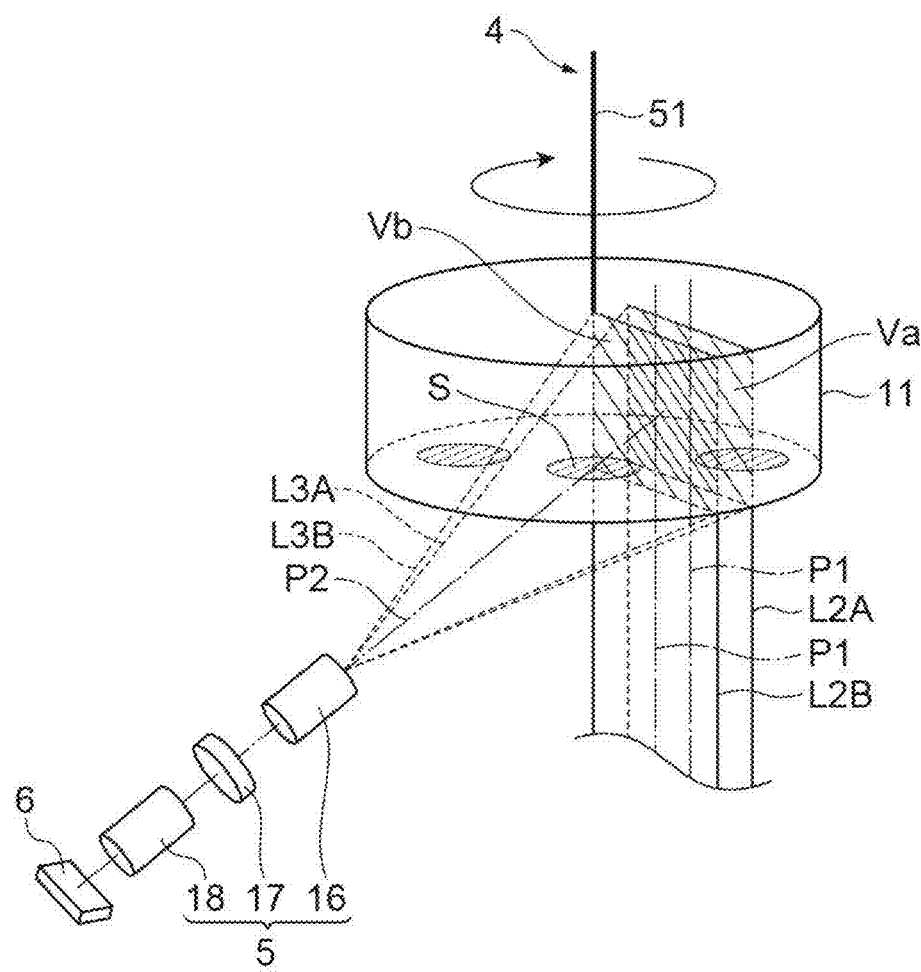
FIG. 13 is a schematic view illustrating a modification of a scanning unit.

In this case, for example, the irradiation surface Va, Vb may be shifted and positioned in a direction according to the tangential direction (R-axis direction) of the rotation of the rotation shaft. In the example of FIG. 13, the irradiation surfaces Va and Vb are shifted from each other in the Y-axis direction as a direction according to the R-axis direction, similarly to the example of FIG. 1. In addition, the image generating unit 8 integrates a plurality of pieces of XZ image data acquired by the image acquiring unit 6 in the Z-axis direction to generate a plurality of pieces of X image data, and generates observation image data 24 from XY image data obtained by reconstructing the plurality of pieces of X image data in the R-axis direction. According to this configuration, the scanning of the planar light L2A, L2B with respect to the sample S held in the circular sample container 11 can be made efficient.

REFERENCE SIGNS LIST

1 Sample Observation Device
3 Irradiation Optical System
4 Scanning Unit
5 Imaging Optical System
6 Image Acquiring Unit
8 Image Generating Unit
21A, 21B XZ Image Data (First Image Data, Second Image Data)
22A, 22B X Image Data (First X Image Data, Second X Image Data)
23A, 23B XY Image Data (First XY Image Data, Second XY Image Data)
24A, 24B Observation Image Data
31 Imaging Surface
31A First Imaging Area
31B Second Imaging Area
32B Region Image Data
L2A, L2B Planar Light (First Planar Light, Second Planar Light)
L3A, L3B Observation Light (First Observation Light, Second Observation Light)
P2 Observation Axis
S Sample
Va, Vb Irradiation Surface (First Irradiation Surface, Second Irradiation Surface)

The invention claimed is:

1. A sample observation device, comprising:
an irradiation optical system configured to emit first planar light and second planar light having different wavelengths so as to pass through cross sections at different positions of a sample;
a scanner configured to scan the sample with respect to a first irradiation surface by the first planar light and a second irradiation surface by the second planar light;
an imaging optical system having an observation axis inclined with respect to the first irradiation surface and the second irradiation surface and imaging each of a light image of first observation light generated in the sample by irradiation with the first planar light and a light image of second observation light generated in the sample by irradiation with the second planar light;
an image sensor configured to acquire first image data corresponding to the light image of the first observation light imaged by the imaging optical system and second image data corresponding to the light image of the second observation light during scanning of the sample by the scanner; and
an image generator configured to generate observation image data of the sample on a basis of the first image data and the second image data, wherein
when a width direction of the planar light is an X axis, a scanning direction of the sample is a Y axis, and an optical axis of the planar light is a Z axis,
a distance between the first planar light and the second planar light in the Y axis direction is L,
an observation depth of the planar light in the Z axis direction is D,
an inclination angle of the observation axis is $\theta'$, and
$L \geq D \times \tan \theta'$.

2. The sample observation device according to claim 1, wherein the irradiation optical system irradiates the sample with the first planar light and the second planar light such that the first irradiation surface and the second irradiation surface are positioned to be shifted in the scanning direction of the sample or a direction according to the scanning direction of the sample.

3. The sample observation device according to claim 1, wherein
the image sensor acquires a plurality of pieces of first XZ image data corresponding to the first image data and a plurality of pieces of second XZ image data corresponding to the second image data, and
the image generator generates a plurality of pieces of first X image data obtained by integrating the plurality of pieces of first XZ image data in a Z-axis direction and a plurality of pieces of second X image data obtained by integrating the plurality of pieces of second XZ image data in the Z-axis direction, and generates the observation image data on a basis of first XY image data obtained by combining the plurality of pieces of first X image data in a Y-axis direction and second XY image data obtained by combining the plurality of pieces of second X image data in the Y-axis direction.

4. The sample observation device according to claim 1, wherein the image sensor includes an imaging surface divided into a first imaging area for acquiring the first image data and a second imaging area for acquiring the second image data.

5. The sample observation device according to claim 4, wherein the first imaging area and the second imaging area are continuous on the imaging surface.

6. The sample observation device according to claim 1, wherein the image generator generates the observation image data in consideration of a number of delay frames between acquisition of the first image data and acquisition of the second image data in the image sensor.

7. The sample observation device according to claim 1, wherein the image generator generates region image data regarding an existing region of the sample in the image using one of the first image data and the second image data, and generates the observation image data on a basis of the region image data.

8. A sample observation method, comprising:
emitting first planar light and second planar light having different wavelengths so as to pass through cross sections at different positions of a sample;
scanning the sample with respect to a first irradiation surface by the first planar light and a second irradiation surface by the second planar light;
imaging each of a light image of first observation light generated in the sample by irradiation with the first planar light and a light image of second observation light generated in the sample by irradiation with the second planar light by using an imaging optical system having an observation axis inclined with respect to the first irradiation surface and the second irradiation surface;

acquiring, during scanning of the sample, each of first image data corresponding to the light image of the first observation light and second image data corresponding to the light image of the second observation light imaged by the imaging optical system; and generating observation image data of the sample on a basis of the first image data and the second image data, wherein when a width direction of the planar light is an X axis, a scanning direction of the sample is a Y axis, and an optical axis of the planar light is a Z axis, a distance between the first planar light and the second planar light in the Y axis direction is L, an observation depth of the planar light in the Z axis direction is D, an inclination angle of the observation axis is θ', and L>D×tan θ'.

9. The sample observation method according to claim 8, wherein in the emitting, the sample is irradiated with the first planar light and the second planar light such that the first irradiation surface and the second irradiation surface are positioned to be shifted in the scanning direction of the sample or a direction according to the scanning direction of the sample.

10. The sample observation method according to claim 8, wherein in the acquiring, a plurality of pieces of first XZ image data corresponding to the first image data and a plurality of pieces of second XZ image data corresponding to the second image data are acquired, in the generating, a plurality of pieces of first X image data obtained by integrating the plurality of pieces of first XZ image data in a Z-axis direction and a plurality of pieces of second X image data obtained by integrating the plurality of pieces of second XZ image data in a Z-axis direction are generated, and the observation image data is generated on a basis of first XY image data obtained by combining the plurality of pieces of first X image data in a Y-axis direction and second XY image data obtained by combining the plurality of pieces of second X image data in the Y-axis direction.

11. The sample observation method according to claim 8, wherein in the acquiring, an imaging surface divided into a first imaging area for acquiring the first image data and a second imaging area for acquiring the second image data is used.

12. The sample observation method according to claim 11, wherein the first imaging area and the second imaging area are continuous on the imaging surface.

13. The sample observation method according to claim 8, wherein in the generating, the observation image data is generated in consideration of a number of delayed frames between acquisition of the first image data and acquisition of the second image data.

14. The sample observation method according to claim 8, wherein in the generating, region image data regarding an existing region of the sample in the image is generated using one of the first image data and the second image data, and the observation image data is generated on a basis of the region image data.

* * * * *